United States Patent [19]
Rasmussen

[11] Patent Number: 6,048,101
[45] Date of Patent: Apr. 11, 2000

[54] THRUST BEARING ARRANGEMENT

[75] Inventor: Ole H. Rasmussen, Michigan City, Ind.

[73] Assignee: Sullair Corporation, Michigan City, Ind.

[21] Appl. No.: 09/207,805

[22] Filed: Dec. 9, 1998

[51] Int. Cl.[7] .............................. F16C 19/10; F16C 25/06
[52] U.S. Cl. .......................... 384/616; 384/611; 384/517
[58] Field of Search .................................. 384/604, 609, 384/611, 613, 616, 517, 518; 418/203

[56] References Cited

U.S. PATENT DOCUMENTS

| | | | |
|---|---|---|---|
| 1,310,756 | 7/1919 | Langhaar | 384/517 |
| 3,056,636 | 10/1962 | Mims | 384/517 |
| 3,516,717 | 6/1970 | Peterson | 384/517 |
| 3,738,719 | 6/1973 | Langner | 384/517 |
| 3,909,085 | 9/1975 | Wilkinson et al. | 384/517 |
| 4,730,995 | 3/1988 | Dewhirst | 384/517 X |
| 4,915,514 | 4/1990 | Soderlund | 384/611 X |
| 5,067,827 | 11/1991 | Bokel | 384/537 |
| 5,316,393 | 5/1994 | Duagherty | 384/517 |
| 5,411,388 | 5/1995 | Soderlund | 418/203 |
| 5,540,575 | 7/1996 | Takano et al. | 384/613 X |
| 5,547,291 | 8/1996 | Miyazaki et al. | 384/512 |
| 5,810,483 | 9/1998 | Vites | 384/517 |

OTHER PUBLICATIONS

Product Brochure "Encapsulated Compressor Series ES 5 to 30 HP", Sullair Corporation 1995.
Product Brochure "Lubricated Compressor Series LS 150 to 450 HP", Sullair Corporation 1995.
Product Brochure "Tandem Compressor Series TS 100 to 600 HP", Sullair Corporation 1995.
Production Brochure "Rotary Screw Vacuum Systems Series VS 78 to 3000 ACFM", Sullair Corporation 1995.
Product Brochure "Leadership in Rotary Screw Compression Technology", Sullair Corporation 1998.
Drawing showing an older thrust bearing arrangement from MAN/GHH, No Date.
Drawing showing a recent bearing arrangement from MAN/GHH, No Date.
Drawing showing a bearing arrangement from SKF, No Date.
Drawing showing a bearing arrangement manufactured and sold by Assignee. No Date.
Copy of p. 101 from NSK Engineering Catalog (Pr. No. A2116) No Date.
Copy of pp. 52 and 53 from SKF Precision Bearing Catalog (3700/IE) No Date.
Copy of p. 55 from Timken Bearing Selection Handbook (1986).

*Primary Examiner*—Thomas R. Hannon
*Attorney, Agent, or Firm*—Marshall O'Toole Gerstein Murray & Borun

[57] ABSTRACT

A thrust bearing arrangement for a rotary shaft includes a main bearing mounted on the rotary shaft at a first axial location and an idler bearing mounted on the shaft at a second axial location spaced from the first axial location. Each of the main bearing and the idler bearing has an inner race in contact with the rotary shaft and a floating outer race. A thrust member is disposed between the outer races of the first and second bearings for transmitting axial thrust forces to a machine frame. A spring maintains a preload condition on the bearings.

17 Claims, 4 Drawing Sheets

THRUST BEARING ARRANGEMENT

TECHNICAL FIELD

The present invention relates generally to bearings for rotating machines, and more particularly, to a thrust bearing arrangement for a rotary shaft.

BACKGROUND ART

Machines utilizing one or more rotary shafts include bearings which must not only prevent wear at the rotating-stationary interface, but which also must prevent substantial radial and/or axial movement of the shaft. In the case of a rotary screw compressor, thrust bearings are used which prevent substantial axial movement of male and female rotors which are rotating at high speeds. In this application, it is critical to limit axial movement to keep the service life of the bearings as long as possible.

Soderlund U.S. Pat. No. 5,411,388 discloses a rotary screw machine with thrust balanced bearings. A shaft journal is supported axially by two main angular contact ball bearings arranged face-to-face with the inner races clamped toward the lower pressure end of the machine. The shaft journal is further mounted in a balancing thrust bearing spaced from the main thrust bearings. A thrust balancing device is provided between the main thrust bearings and the balancing thrust bearing and counteracts the gas forces on the rotor of the machine in turn to reduce the forces transmitted through the main thrust bearings. The main thrust bearings are preloaded by a belleville washer which is disposed at an axial end of the rotor.

Referring to FIG. 1, a prior art bearing arrangement 10 included a pair of bearings 12, 14 which was bought as a set and which obtained a predetermined preload when clamped together. A thrust plate 16 and an inner ring 18 were ground together to assure even thickness and were interposed between the bearings 12, 14. The faces of the thrust plate 16 were not hardened. Initially, the bearings had no end shields and were exposed to corrosive compressed refrigeration or natural gas. This bearing arrangement proved to be troublesome, probably due to wear of the faces of the thrust plate 16 in combination with large variations of preload from the bearing manufacturers and exposure to the compressed gas. Subsequently, end shields 20 and helical compression springs 22 were added and the faces of the thrust plate were hardened. However, expected improvements in reliability were not realized. The springs 22 did develop a constant preload but if the position preload disappeared, and a small clearance developed between the bearing faces and the thrust plate 16, the rotor could fully axially move within the clearance space, thus causing vibration and fretting of the thrust bearing faces.

Referring to FIG. 2, a low speed (flooded) rotary screw machine has been sold by the assignee of the present application having a bearing arrangement 30 including a main thrust bearing 32 and a reverse thrust bearing 34 mounted in a face-to-face relationship on a rotor shaft 35. A first thrust plate 36 and a spacer 37 bear against the main thrust bearing 32 while a second thrust plate 38 bears against the reverse thrust bearing 34. The bearing arrangement 30 is captured between a shoulder 40 on the shaft 35 and a bearing nut 41. A preload condition is established on the bearings 32, 34 and is maintained by a set of helical springs 42 disposed in circumferentially-spaced recesses 43 in the first thrust plate 36 and by a wave spring 44 disposed in an annular recess 46 in the second thrust plate 38.

SUMMARY OF INVENTION

A bearing arrangement effectively prevents axial movement of a rotary member in a simple and effective manner.

More particularly, according to one aspect of the present invention, a thrust bearing arrangement for a rotary shaft includes a main bearing mounted on the rotary shaft at a first axial location and an idler bearing mounted on the shaft at a second axial location spaced from the first axial location. The idler bearing is disposed in a back-to-back arrangement with the main bearing. Each of the main bearing and the idler bearing has an inner race in contact with the rotary shaft and a floating outer race. A thrust member is disposed between the outer races of the first and second bearings for transmitting axial thrust forces to a machine frame. A spring is mounted in a spring recess in an axial face of the thrust member and maintains a preload condition on the bearings.

Preferably, the spring comprises a wave spring. Also preferably, the main bearing has a first contact angle axis and the idler bearing has a second contact angle axis which intersects the first contact angle axis at a point remote from the rotary shaft.

Still further in accordance with the preferred embodiment, the thrust member comprises a plate and means are provided in contact with the inner races of the main and idler bearings for transmitting clamping forces therebetween. Also, the transmitting means preferably comprises a spacer ring carried by the rotary shaft between the inner races of the main and idler bearings.

According to one alternative embodiment, the transmitting means has an axial thickness less than an axial thickness of the thrust member and the bearing arrangement further includes means in contact with the inner races for establishing the preload condition.

According to another alternative embodiment, the preload condition is established by an interference fit between the rotary shaft and the inner races of the main and idler bearings.

According to another aspect of the present invention, a thrust bearing arrangement for a rotary shaft of a rotary screw compressor having a machine frame includes a main bearing mounted on the rotary shaft at a first axial location and an idler bearing mounted on the shaft at a second axial location spaced from the first axial location. Each of the main bearing and the idler bearing has an inner race in contact with the rotary shaft and a floating outer race. A thrust member is disposed between and in contact with the outer races of the first and second bearings for transmitting axial thrust forces to the machine frame. The thrust member includes a recess in an axial face thereof. A spacer ring is carried by the rotary shaft between the inner races of the main and idler bearings. A preload condition is established on the bearings and a spring is disposed in the recess of the spring member and maintains the preload condition on the bearings.

According to yet another aspect of the present invention, a thrust bearing arrangement for a rotary shaft of a rotary screw compressor having a machine frame includes a main bearing mounted on the rotary shaft at a first axial location and an idler bearing mounted on the shaft at a second axial location spaced from the first axial location. The idler bearing is disposed in a back-to-back arrangement with the main bearing. Each of the main bearing and the idler bearing has an inner race in contact with the rotary shaft and a floating outer race and the main bearing has a first contact angle axis and the idler bearing has a second contact angle axis which intersects the first contact angle axis at a point remote from the rotary shaft. A thrust plate is disposed between and in contact with the outer races of the first and second bearings for transmitting axial thrust forces to the machine frame and includes a recess in an axial face. A spacer ring is carried by the rotary shaft between the inner races of the main and idler bearings and a preload condition is established on the bearings. A wave spring is disposed in the recess in the axial face between the bearings and maintains the preload condition on the bearings.

The present invention maintains a substantially constant preload on the bearings so that vibration and wear are minimized.

Other aspects and advantages of the present invention will become apparent upon consideration of the following drawings and detailed description.

DESCRIPTION OF THE PREFERRED EMBODIMENT

Figure 3:
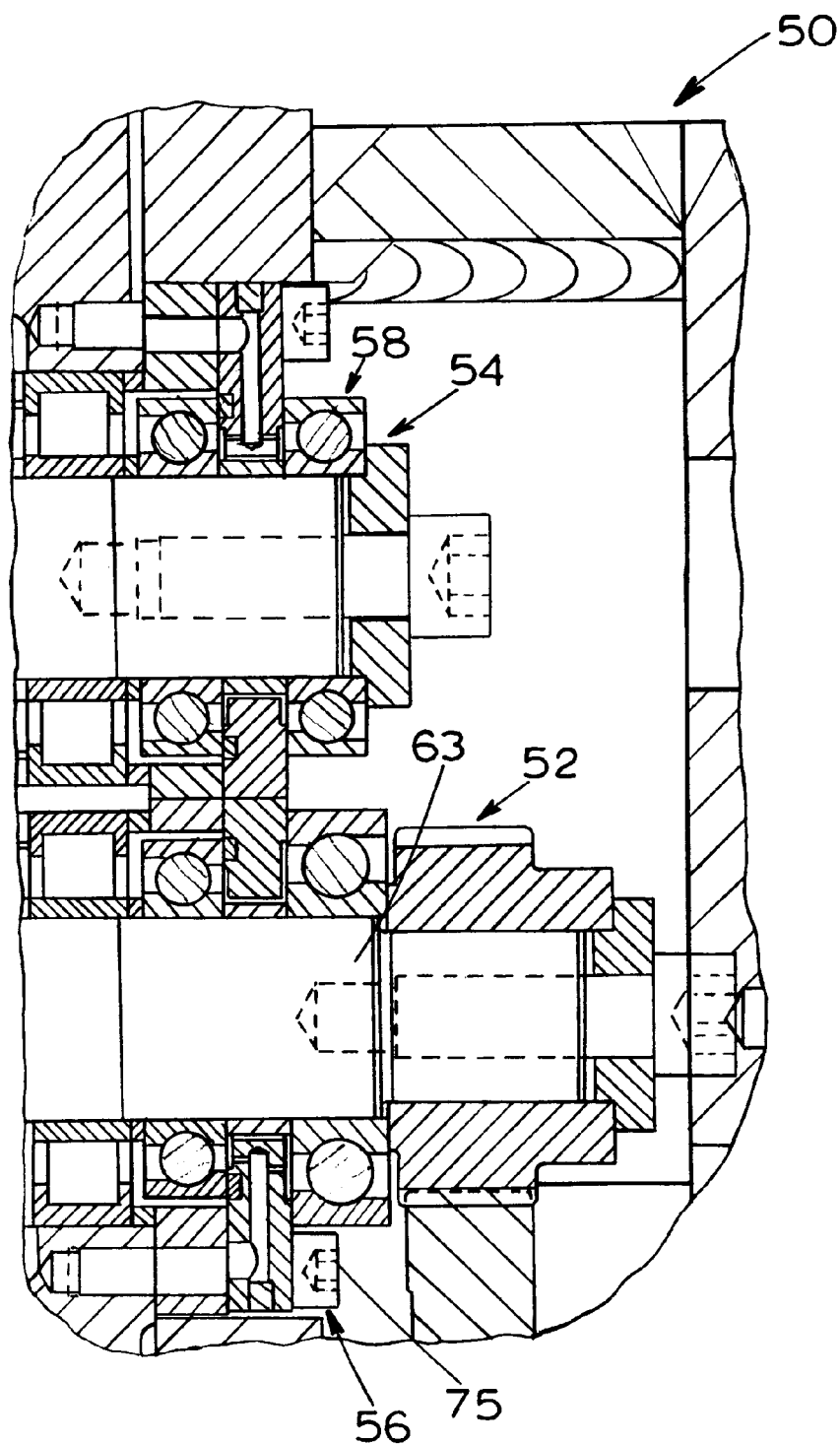
FIG. 3 comprises a fragmentary sectional view of a machine incorporating the present invention.
Figure 4:
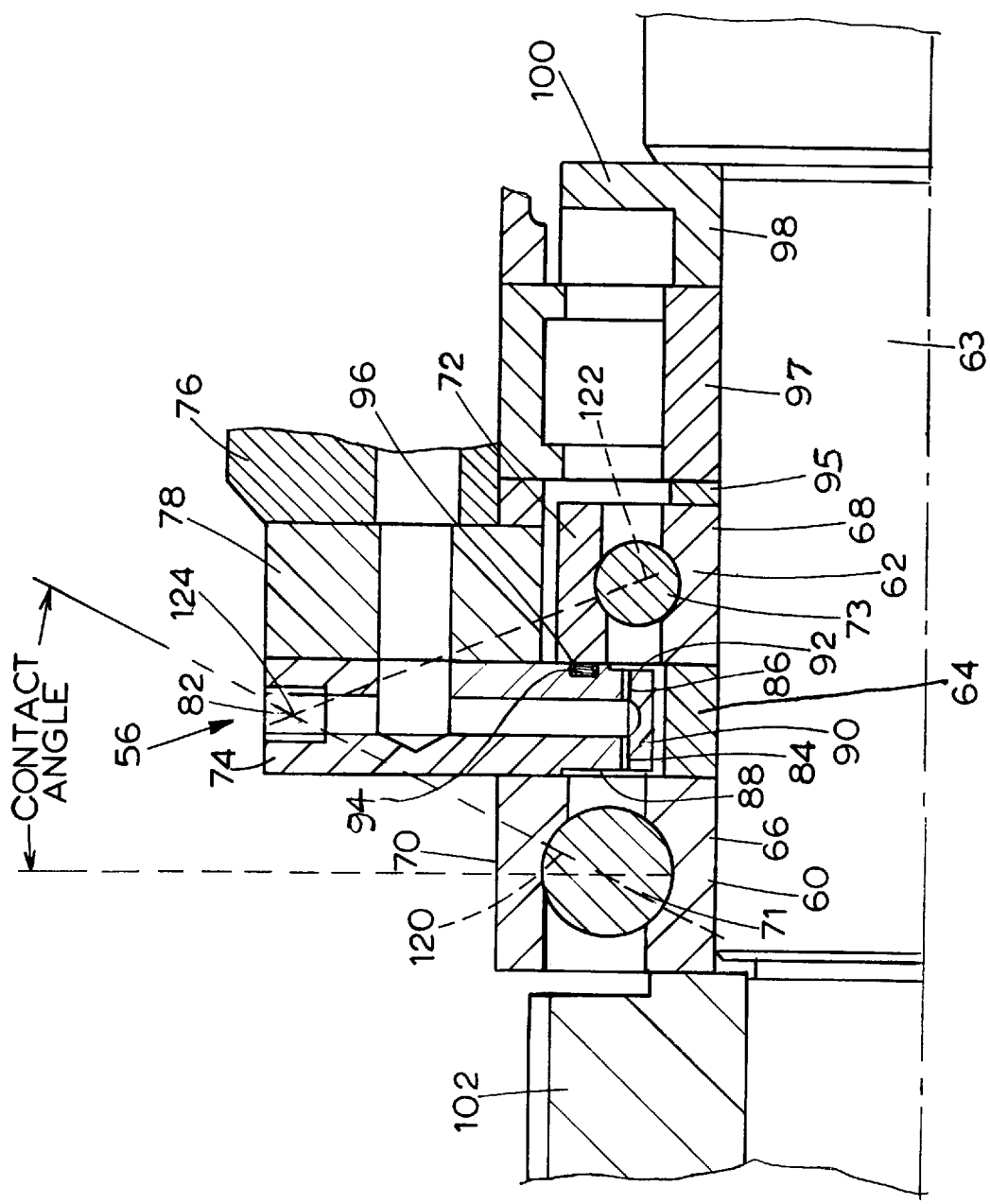
FIG. 4 is an enlarged, fragmentary, sectional view of the bearing arrangement according to the present invention.

Referring now to FIG. 3, a rotary machine in the form of a high speed (dry screw)rotary screw compressor 50 includes male and female rotors 52, 54, respectively, each of which is mounted in bearing assemblies 56, 58, respectively. Because the workings of the bearing assemblies 56, 58 are identical, only the bearing assembly 56 will be described in detail. Referring also to FIG. 4, the bearing assembly 56 includes a main bearing 60 and an idler bearing 62 mounted on a shaft 63. Because of the high speeds of operation, the bearings must have high precision (i.e., ISO Class 6 or better). The main bearing 60 is spaced from the idler bearing 62 by a spacer ring 64 which contacts inner races 66, 68 of the main and idler bearings 60, 62, respectively. Outer races 70, 72 of the main bearing 60 and the idler bearing 62, respectively, are left floating in the radial direction (i.e., radially outer surfaces of the races 70, 72 are not in contact with another structure) owing to the operation of such bearings only to control axial thrust forces and not radial forces. Ball elements 71 and 73 are disposed in the bearings 60 and 62, respectively.

Figure 1:
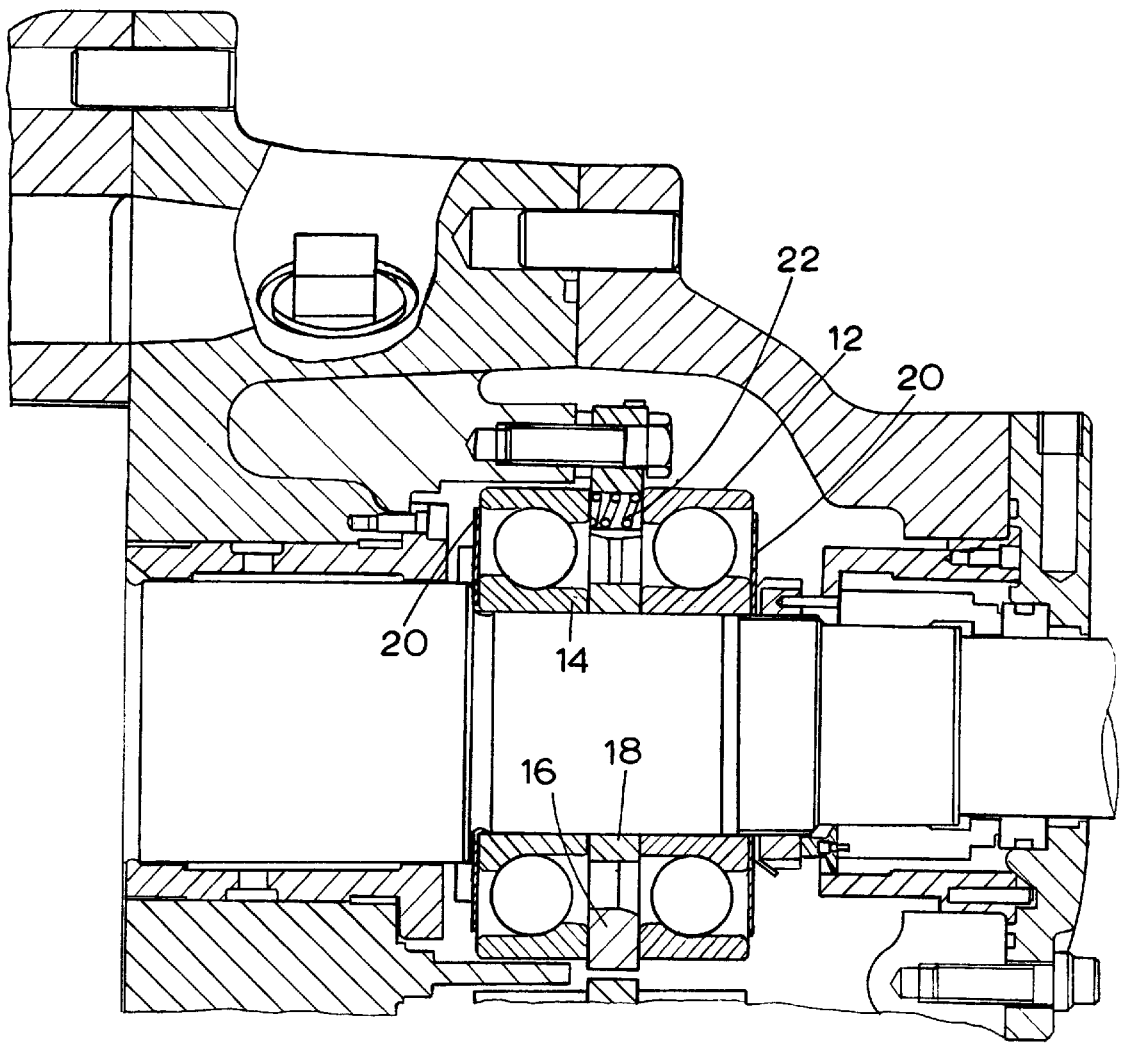
FIGS. 1 and 2 comprise fragmentary sectional views of prior art bearing arrangements.
Figure 2:
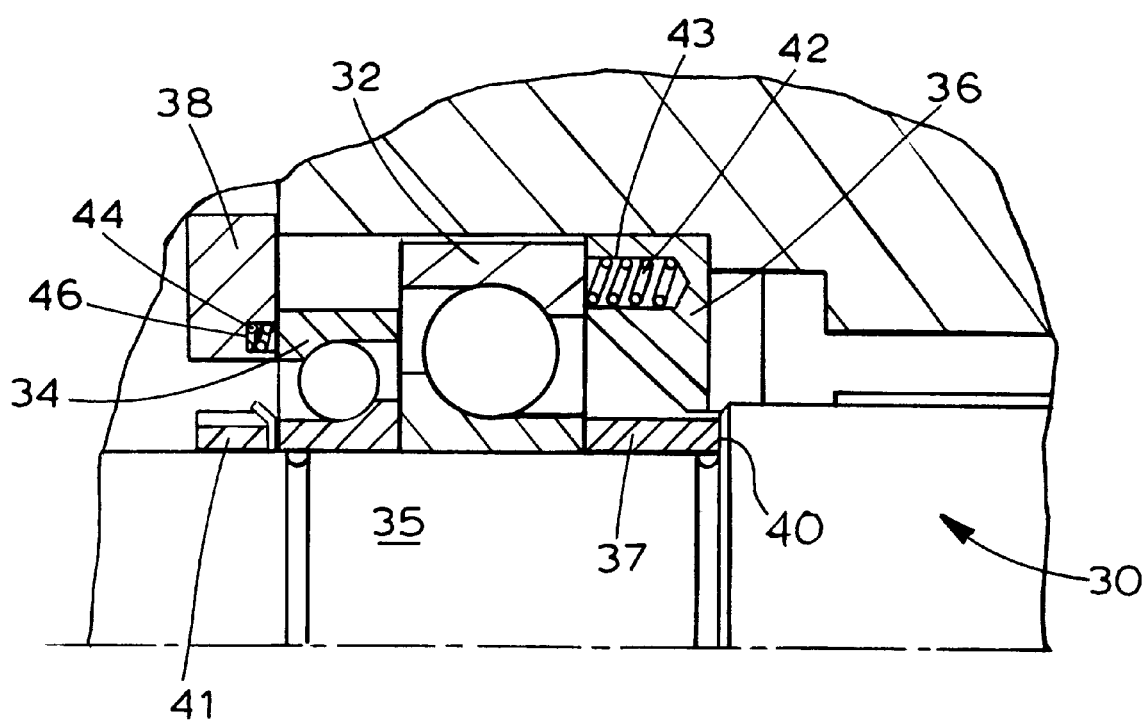

A thrust member in the form of a plate 74 or any other suitable structure surrounds the spacer ring 64 and is secured by bolts 75 (one of which is visible in FIG. 2) to a frame 76 of the machine 50 via a spacer member 78. In order to prevent wear and subsequent reduction in preload, the faces of the thrust plate 74 must be surface hardened to min.RC55. An oil passage 82 extends though the thrust plate 74 so that oil or another lubricant can be supplied to the bearings via cross-passages 84, 86 and relieved surfaces 88, 90, 92. In addition to the foregoing, the thrust plate 74 includes an annular recess 94 in an axial face thereof within which a biasing member in the form of a wave spring 96 is disposed.

The main bearing 60 has a first contact angle axis represented by dashed lines 120 whereas the idler bearing 62 has a second contact angle axis represented by dashed line 122. In the preferred embodiment, the first contact angle axis is a maximum of approximately 25 degrees from the vertical (as seen in FIG. 4) when steel balls are used as the ball elements 71 and approximately 30 degrees from the vertical when ceramic ball elements are used. Also in the preferred embodiment, the second contact angle axis has a minimum angle of approximately 15 degrees from the vertical. As can be seen by an inspection of FIG. 4, the axes 120 and 122 intersect at a point 124 well outside the outer margins of the shaft 63. In this configuration, the mounting of the bearings 60, 62 is referred to as "back-to-back," as opposed to the "face-to-face" mounting of the bearings of FIG. 2 wherein the contact angle axes intersect at a point on the shaft side of the bearings.

The inner races 66, 68, the spacer ring 64, an additional spacer ring 95, an inner bearing race 97 and an end ring 98 are firmly captured between a shoulder portion 100 of the shaft 63 and a pinion gear 102. A preload is applied to the bearings 60, 62 in any of a number of ways. According to a first alternate embodiment, and assuming that the bearing contact faces are flush ground, the axial thickness of the spacer ring 64 is selected to be slightly less (i.e., on the order of a few microns) than the axial thickness of the thrust plate 74. This difference in thickness can be obtained by initially machining the spacer ring 64 and the thrust plate 74 to the same thickness and thereafter grinding or otherwise removing material from one or both of the axial faces of the spacer ring 64 after assembly. When the parts are thereafter assembled and clamped together under force, the inner races 66, 68 of the bearings 60, 62 will be separated by a distance slightly less than the distance between the outer races 70, 72, thereby developing the desired preload condition.

In a further alternate embodiment, again assuming that the bearing contact faces are flush ground, the interference fits between the inner races 66 and 68 and the shaft 63 can be adjusted within certain limits to obtain the desired position preload.

The initial axial bearing adjustment must be such that the bearings 60, 62 have zero to very light preload at operating speed and temperature.

Thereafter, the preload condition is maintained even under transient load conditions by the wave spring 96. Specifically, during steady state operation under load, thrust forces are developed and transmitted from the shaft 63, through the inner race 66, the ball elements 71 and the outer race 70 of the main bearing 60 to the thrust member 74 and thence to the frame 76. An axial load exceeding the specified minimum axial load of the idler bearing 62 is developed during this time by the wave spring 96. During an offloading transient of the shaft 63, the wave spring 96 again supplies sufficient spring force to keep the applied force on the main bearing 60 above the specified minimum axial load for this bearing.

If ceramic ball elements 71 are used for the main bearing 60, a wave spring exerting a lower spring force can be used as compared to the spring force required if steel ball elements are used. This, in turn, permits high speed operation at light loads without skidding of the ball elements.

As a result of the foregoing, little or no substantial movement of the shaft 63 occurs during transients, thereby minimizing vibration and resulting bearing wear. In addition, axial and radial expansions resulting from temperature differentials between inner and outer races will have a tendency to cancel each other out with this bearing arrangement.

If desired, the pinion gear 102 may have a high helix angle such that forces are developed during operation tending to reduce the thrust forces experienced by the bearing assembly.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights of all modifications which come within the scope of the appended claims are reserved.

What is claimed is:

1. A thrust bearing arrangement for a rotary shaft, comprising:

a main bearing mounted on the rotary shaft at a first axial location;

an idler bearing mounted on the shaft at a second axial location spaced from the first axial location and being disposed in a back-to-back arrangement with the main bearing;

each of the main bearing and the idler bearing having an inner race in contact with the rotary shaft and a floating outer race;

a thrust member disposed between the outer races of the first and second bearings for transmitting axial thrust forces to a machine frame; and a spring mounted in a spring recess in an axial face of the thrust member, the spring maintaining a preload condition on the bearings.

2. The thrust bearing arrangement of claim 1, wherein the spring comprises a wave spring.

3. The thrust bearing arrangement of claim 1, wherein the main bearing has a first contact angle axis and the idler bearing has a second contact angle axis which intersects the first contact angle axis at a point remote from the rotary shaft.

4. The thrust bearing arrangement of claim 1, wherein the thrust member comprises a plate.

5. The thrust bearing arrangement of claim 1, further including means in contact with the inner races of the main and idler bearings for transmitting clamping forces therebetween.

6. The thrust bearing arrangement of claim 5, wherein the transmitting means comprises a spacer ring carried by the rotary shaft between the inner races of the main and idler bearings.

7. The thrust bearing arrangement of claim 5, wherein the transmitting means has an axial thickness less than an axial thickness of the thrust member and further including means in contact with the inner races for establishing the preload condition.

8. The thrust bearing arrangement of claim 5, wherein the preload condition is established by an interference fit between the rotary shaft and the inner races of the main and idler bearings.

9. A thrust bearing arrangement for a rotary shaft of a rotary screw compressor having a machine frame, comprising:

a main bearing mounted on the rotary shaft at a first axial location;

an idler bearing mounted on the shaft at a second axial location spaced from the first axial location;

each of the main bearing and the idler bearing having an inner race in contact with the rotary shaft and a floating outer race;

a thrust member disposed between and in contact with the outer races of the first and second bearings for transmitting axial thrust forces to the machine frame, the thrust member having a recess in an axial face thereof;

a spacer ring carried by the rotary shaft between the inner races of the main and idler bearings;

wherein a preload condition is established on the bearings; and a spring disposed in the recess in the spring member and maintaining the preload condition on the bearings.

10. The thrust bearing arrangement of claim 9, wherein the spring comprises a wave spring.

11. The thrust bearing arrangement of claim 9, wherein the main bearing has a first contact angle axis and the idler bearing has a second contact angle axis which intersects the first contact angle axis at a point remote from the rotary shaft.

12. The thrust bearing arrangement of claim 9, wherein the thrust member comprises a plate.

13. The thrust bearing arrangement of claim 9, wherein the spacer ring has an axial thickness less than an axial thickness of the thrust member and further including means in contact with the inner races for establishing the preload condition.

14. The thrust bearing arrangement of claim 13, wherein the preload condition is established by an interference fit between the rotary shaft and the inner races of the main and idler bearings.

15. A thrust bearing arrangement for a rotary shaft of a rotary screw compressor having a machine frame, comprising:

a main bearing mounted on the rotary shaft at a first axial location;

an idler bearing mounted on the shaft at a second axial location spaced from the first axial location and being disposed in a back-to-back arrangement with the main bearing;

each of the main bearing and the idler bearing having an inner race in contact with the rotary shaft and a floating outer race and wherein the main bearing has a first contact angle axis and the idler bearing has a second contact angle axis which intersects the first contact angle axis at a point remote from the rotary shaft;

a thrust plate disposed between and in contact with the outer races of the first and second bearings for transmitting axial thrust forces to the machine frame and having a recess in an axial face;

a spacer ring carried by the rotary shaft between the inner races of the main and idler bearings;

wherein a preload condition is established on the bearings; and a wave spring disposed in the recess in the axial face between the bearings and maintaining the preload condition on the bearings.

16. The thrust bearing arrangement of claim 15, wherein the spacer ring has an axial thickness less than an axial thickness of the thrust plate and further including means in contact with the inner races for establishing the preload condition.

17. The thrust bearing arrangement of claim 15, wherein the preload condition is established by an interference fit between the rotary shaft and the inner races of the main and idler bearings.

* * * * *